United States Patent [19]

Newell

[11] Patent Number: 5,002,357

[45] Date of Patent: Mar. 26, 1991

[54] OPTICAL FIBER COUPLER

[75] Inventor: Edwin R. Newell, Wake Forest, N.C.

[73] Assignee: Square D Company, Palatine, Ill.

[21] Appl. No.: 433,941

[22] Filed: Nov. 9, 1989

[51] Int. Cl.$^5$ .............................................. G02B 6/36
[52] U.S. Cl. ................................................. 350/96.20
[58] Field of Search .......................... 350/96.20–96.22

[56] References Cited

U.S. PATENT DOCUMENTS

| | | | |
|---|---|---|---|
| 4,427,879 | 1/1984 | Becher et al. | 250/215 X |
| 4,737,008 | 4/1988 | Ohyama et al. | 350/96.20 |
| 4,744,626 | 5/1988 | Mery | 350/96.20 |
| 4,840,451 | 6/1989 | Sampson et al. | 350/96.20 |

*Primary Examiner*—Akm Ullah
*Attorney, Agent, or Firm*—Donald P. Reynolds; Michael J. Femal

[57] ABSTRACT

An optical fiber coupler including an optical fiber having an end, and an electronic light pulse communication assembly comprising an assembly housing, an electronic light pulse communication device fixed within the assembly housing, and a lens mounted on the assembly housing and in light pulse communication with the electronic light pulse communication device. The optical fiber coupler also includes a coupler housing having an inlet well, an assembly well separated from the inlet well by a coupler housing wall and having the assembly fixedly received therein, and a fiber passage which extends between the inlet well and the assembly well and which snugly receives the fiber so that the fiber end is adjacent the assembly lens. The coupler housing further includes epoxy in the inlet well so that the fiber is secured to the coupler housing, and index matching gel surrounding the optical fiber end to assembly lens junction so that substantially all of the light passing between the assembly lens and the fiber does not escape from the optical fiber end to assembly lens junction.

5 Claims, 2 Drawing Sheets

OPTICAL FIBER COUPLER

FIELD OF THE INVENTION

This invention relates to connections and couplers for connecting optical fibers to other optical fibers and to printed circuit boards.

SUMMARY OF THE INVENTION

This invention comprises an optical fiber coupler including an optical fiber having an end, and an electronic light pulse communication assembly comprising an assembly housing, an electronic light pulse communication device fixed within the assembly housing, and a lens mounted on the assembly housing and in light pulse communication with the electronic light pulse communication device.

The optical fiber coupler also includes a coupler housing having an inlet well, an assembly well separated from the inlet well by a coupler housing wall and having the assembly fixedly received therein, and a fiber passage which extends between the inlet well and the assembly well and which snugly receives the fiber so that the fiber end is adjacent the assembly lens.

The coupler housing further includes epoxy in the inlet well so that the fiber is secured to the coupler housing, and index matching gel surrounding the optical fiber end to assembly lens junction so that substantially all of the light passing between the assembly lens and the fiber does not escape from the optical fiber end to assembly lens junction.

One of the features of the invention is the provision of an efficient and secure optical fibers to printed circuit board coupler. This coupler insures a good fibers to printed circuit board connection with substantially all of the light passing between the fibers and the electronic communication device. Prior art couplers have not been known to be able to both use an epoxy to fix a fiber end in place while at the same time being able to use an index gel at a fiber end to lens junction to help insure all light passes between the fiber end and the lens.

Other features and advantages of the invention will become apparent to those skilled in the art upon review of the following detailed description, claims and drawings.

Figure 1:
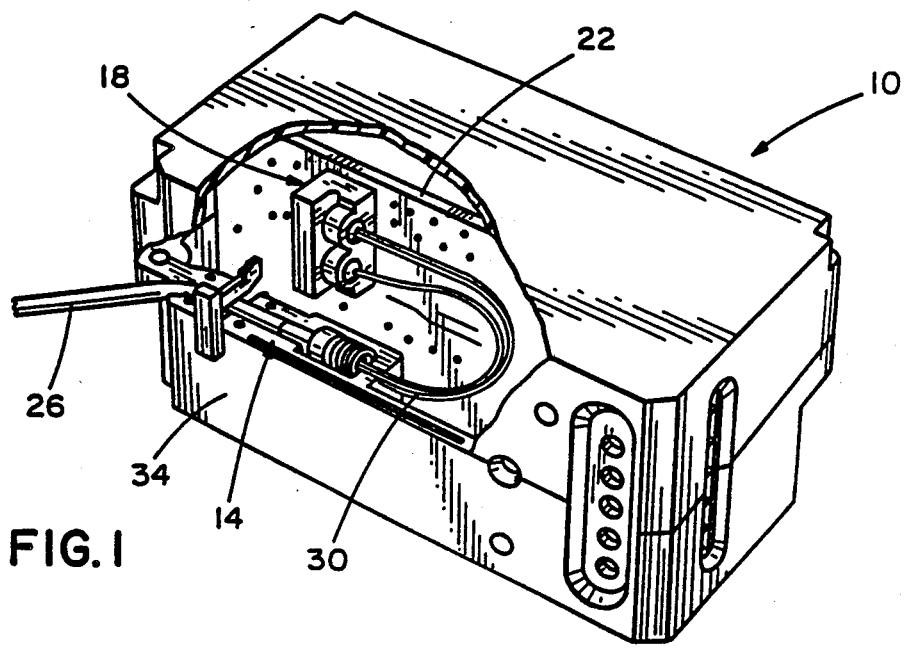
FIG. 1 is a perspective view, partially broken away, of a fiber optical transceiver which embodies various of the features of the invention.
Figure 2:
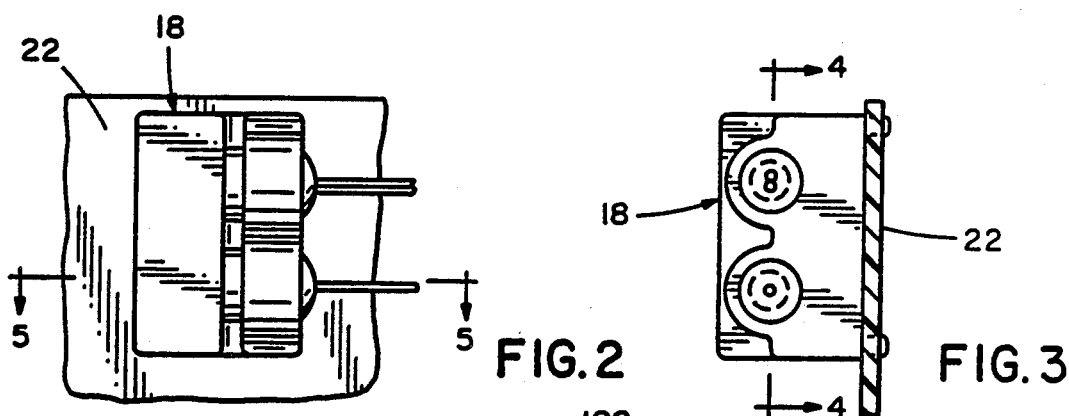
FIG. 2 is a side view of a coupler for connecting a plurality of fibers to a printed circuit board which embodies various of the features of the invention.
Figure 3:
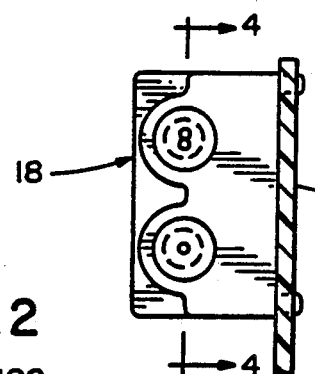
FIG. 3 is an end view of the coupler illustrated in FIG. 2.
Figure 4:
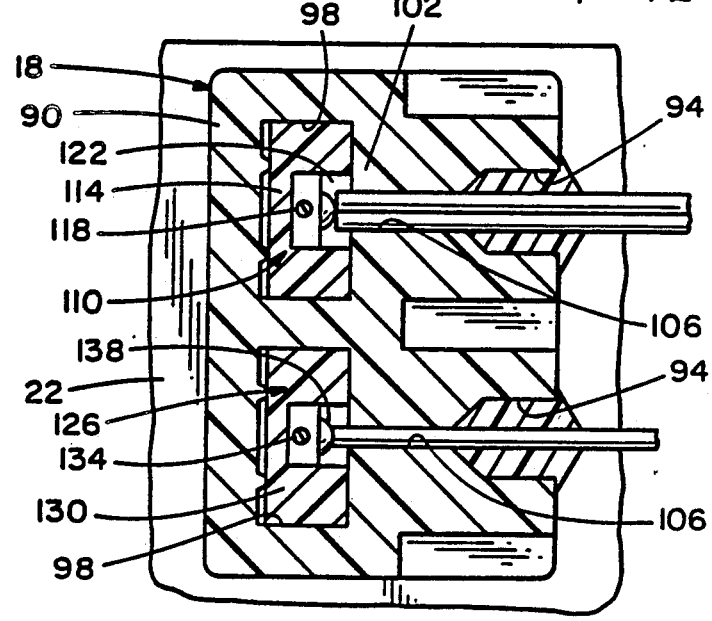
FIG. 4 is a cross sectional view of the coupler illustrated in FIG. 2 taken along the line 4—4 in FIG. 3.

Before one embodiment of the invention is explained in detail, it is to be understood that the invention is not limited in its application to the details of construction and the arrangement of components set forth in the following description or illustrated in the drawings. The invention is capable of other embodiments and if being practiced or being carried out in various ways. Also, it is to be understood that the phraseology and terminology used herein is for the purpose of description and should not be regarded as limiting.

DETAILED DESCRIPTION OF THE PREFERRED EMBODIMENT OF THE INVENTION

Illustrated in the drawings is a fiber optic transceiver 10 for transmitting and receiving optical pulses. The transceiver 10 includes a fiber to fiber connection 14, an optical fiber coupler 18, and a conventional transceiver processing and indicating means including a printed circuit board 22.

More particularly, the fiber to fiber connection 14 includes a first optical fiber end 26, a second optical fiber end 30, and a connector housing 34. The connector housing 34 has a connection chamber 38 (see FIG. 8), a first fiber inlet passage 42 which communicates with the connection chamber 38 and which snugly but slidably receives the first fiber end 26, and a second fiber inlet passage 46 which communicates with the connection chamber 38 and which slidably receives the second fiber end 30. The second fiber inlet passage 46 enters the connection chamber 38 on a side opposite from the first fiber inlet passage 42.

Figure 8:
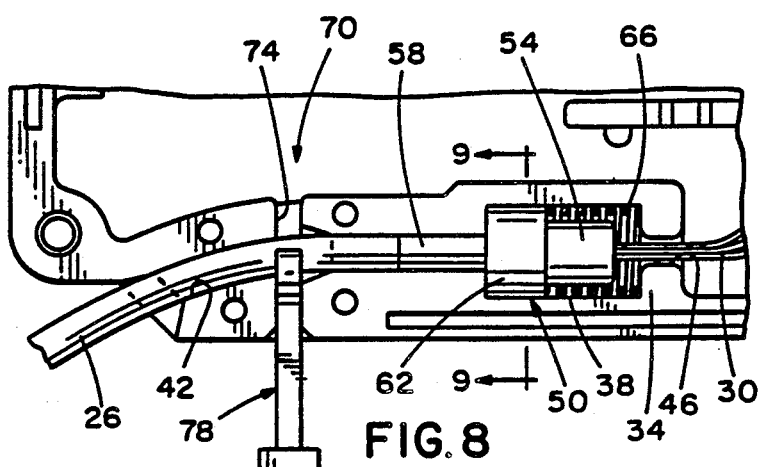
FIG. 8 is a top view of the fiber to fiber connection which is illustrated in FIG. 1 and which embodies various of the features of the invention. The connection includes a coupler housing and is shown with a first fiber end only partially inserted and with a shuttle in its second position.
Figure 10:
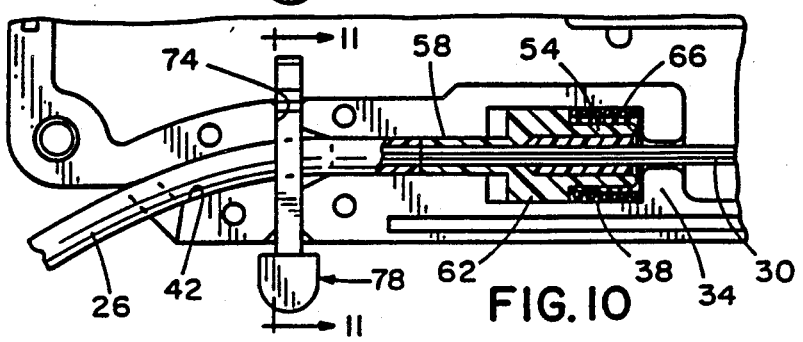
FIG. 10 is top view of the fiber to fiber connection with the first fiber end fully inserted and with the shuttle in its first fiber connecting position.
Figure 11:
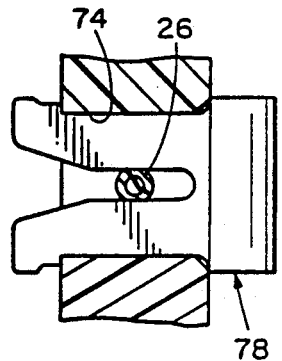
FIG. 11 is a cross sectional view of a clamp used to grasp the first fiber end and fix it to the coupler housing taken along the line 11—11 in FIG. 10.

The fiber to fiber connection 14 further includes a shuttle 50 slidably received within the connection chamber 38 and movable between a first fiber connecting position (see FIG. 10) and a second position (see FIG. 8). The shuttle 50 has a fiber receiving end 54, and a connection end 58 housing the second fiber end 30. The connection end 58 is snugly but slidably received within the first fiber inlet passage 42 so that the second fiber end 30 faces the first fiber end 26. More particularly, there are a plurality of second fiber ends 30 slidably received in the second fiber inlet passage 46 and each of the second fiber ends 30 is housed by the shuttle connection end 58 so that each of the second fiber ends 30 face the first fiber 26 and so that the first fiber end 26 is held in compression against all of the second fiber ends 30. In the preferred embodiment, the second fiber ends 30 are fixed in the connection end 58 with epoxy, and the connection end 58 is ground down to where each of the fiber ends 30 are flush with the connection end 58.

The fiber to fiber connection 14 further includes means for biasing the shuttle 50 toward the first fiber inlet passage 42 from the first fiber connecting position (FIG. 10) to the second position (FIG. 8). More particularly, the shuttle 50 has an enlarged middle 62 between the fiber receiving end 54 and the connection end 58, and the biasing means comprises a compression spring 66 concentric about the fiber receiving end 54, the spring 66 having one end bearing against the connector housing 34 and another end bearing against the shuttle middle 62.

The fiber to fiber connection 14 further includes means 70 for fixing the first fiber end 26 within the first fiber inlet passage 42 with the first fiber end 26 adjacent the shuttle connection end 58 and with the shuttle 50 held by the first fiber end 26 in the first fiber connecting position (FIG. 10) so that the first fiber end 26 is held in compression against the second fiber end 30. More particularly, the means 70 for fixing the first fiber end 26 within the first fiber inlet passage 42 comprises a slot 74 in the connector housing 34 and extending across the first fiber inlet passage 42, and a clamp 78 received within the slot 74 and grasping the first fiber end 26.

The first fiber inlet passage 42 is curved so that the first fiber end 26 is biased by its own resiliency against a wall of the first fiber inlet passage 42 to effect a more exact registry between the first fiber end 26 and the second fiber end 30.

Figure 9:
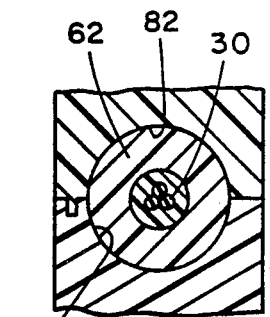
FIG. 9 is a cross sectional view of the shuttle and the coupler housing taken along the line 9—9 in FIG. 8.

The connector housing 34 includes a first piece having a first piece surface 82 (see FIG. 9) and a second piece having a second piece surface 86 abutting the first piece surface 82. The first fiber inlet passage 42, the connection chamber 38, the second fiber inlet passage 46, and the slot 74 are defined by the first and the second piece surfaces.

As illustrated in FIGS. 2 through 7, the fibers to printed circuit board coupler 18 includes a coupler housing 90 (see FIG. 5) adapted to be connected to the printed circuit board 22. The coupler housing 90 has two spaced-apart inlet wells 94 (see FIG. 4), two spaced-apart assembly wells 98 separated from the inlet wells 94 by a coupler housing wall 102, and two fiber passages 106. Each of the fiber passages 106 snugly receives at least one of the plurality of fibers 30 and extends between a separate one of the inlet wells 94 and a separate one of the assembly wells 98. More particularly, two fibers 30 are received in one assembly well 98 and one fiber is received in the other assembly well 98.

The coupler 18 further includes a detector assembly 110 comprising a detector assembly housing 114, a detector 118 fixed within the detector assembly housing 114 and electrically connected (see FIG. 5) to the printed circuit board 22, and a detector assembly lens 122 mounted on the assembly housing 114 and in light pulse communication with the detector 118, the detector assembly 110 being fixedly received in one of the assembly wells 98 so that the detector assembly lens 122 is adjacent the fiber in the assembly well's fiber passage.

Figure 5:
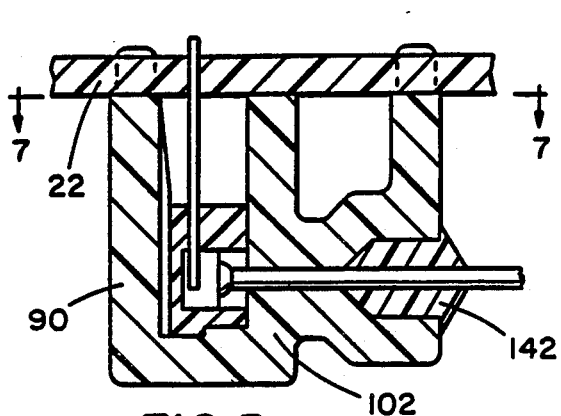
FIG. 5 is a cross sectional view of the coupler illustrated in FIG. 2 taken along the line 5—5 in FIG. 2.
Figure 7:
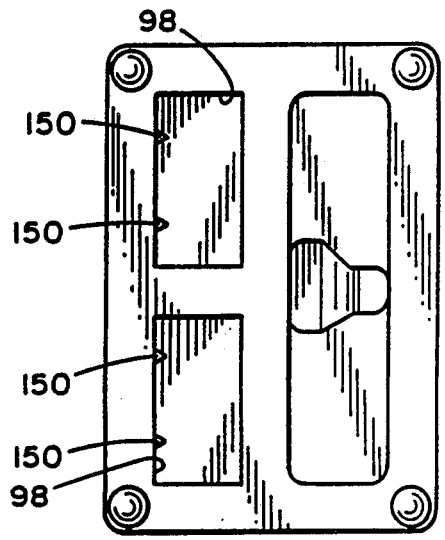
FIG. 7 is a side view of a coupler housing used to construct the coupler illustrated in FIG. 2. The coupler housing is viewed from along the line 7—7 in FIG. 5.
Figure 6:
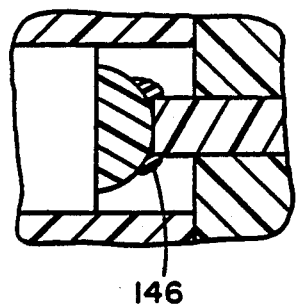
FIG. 6 is an exploded view illustrating the fiber end to lens junction in the coupler illustrated in FIG. 4.

The coupler 18 further includes an emitter assembly 126 including an emitter assembly housing 130, an emitter 134 fixed within the emitter assembly housing 130 and electrically connected to the printed circuit board 22, and an emitter assembly lens 138 mounted on the emitter assembly housing 130 and in light pulse communication with the emitter 134, the emitter assembly 126 being fixedly received in another of the assembly wells 98 so that the emitter assembly lens 138 is adjacent the fiber in the assembly well's fiber passage. More particularly, as illustrated in FIGS. 5 and 7, each assembly well 98 has a plurality of crushable nibs 150 for fixedly securing each of the detector assembly 110 and the emitter assembly 126 in its respective assembly well 98.

The coupler housing 90 further includes epoxy 142 in each fiber inlet well 94 so that the fiber is secured to the coupler housing 90, and index matching gel 146 surrounding each optical fiber end to assembly lens junction so that substantially all of the light passing between the assembly lens and the fiber does not escape from the optical fiber end to assembly lens junction. The housing wall 102 keeps the indexing gel 146 from mixing with the epoxy 142.

Various features of the invention are set forth in the following claims.

I claim:

1. An optical fiber coupler comprising
   an optical fiber having an end,
   an electronic light pulse communication assembly comprising an assembly housing,
   an electronic light pulse communication device fixed within said assembly housing, and
   a lens mounted on said assembly housing and in light pulse communication with said electronic light pulse communication device, and
   a coupler housing having
   an inlet well,
   an assembly well separated from said inlet well by a coupler housing wall and having said assembly fixedly received therein, and
   a fiber passage which extends between said inlet well and said assembly well and which snugly receives said fiber so that said fiber end is adjacent said assembly lens,
   said coupler housing further including
   epoxy in said inlet well so that said fiber is secured to said coupler housing, and
   index matching gel surrounding said optical fiber end to assembly lens junction so that substantially all of the light passing between said assembly lens and said fiber does not escape from said optical fiber end to assembly lens junction.

2. An optical fiber coupler in accordance with claim 1 wherein said electronic light pulse communication device is an emitter.

3. An optical fiber coupler in accordance with claim 1 wherein said electronic light pulse communication device is an detector.

4. A coupler for connecting a plurality of fibers to a printed circuit board, the coupler including
   a coupler housing adapted to be connected to the printed circuit board, said housing having
   a plurality of spaced-apart inlet wells,
   a plurality of spaced-apart assembly wells separated from said inlet wells by a coupler housing wall,
   a plurality of fiber passages, each of which snugly receives one of the plurality of fibers and which extends between a separate one of said inlet wells and a separate one of said assembly wells,
   a detector assembly comprising
   a detector assembly housing,
   a detector fixed within said detector assembly housing and electrically connected to the circuit board, and
   a lens mounted on said detector assembly housing and in light pulse communication with said detector, said detector assembly being fixedly received in one of said assembly wells so that said detector assembly lens is adjacent the fiber in said assembly well's fiber passage, and
   an emitter assembly including an emitter assembly housing, an emitter fixed within said emitter assembly housing and electrically connected to the circuit board, and a lens mounted on said emitter assembly housing and in light pulse communication with said emitter, said emitter assembly being fixedly received in another of said assembly wells so that said emitter assembly lens is adjacent the fiber in said assembly well's fiber passage.

5. A coupler in accordance with claim 4 wherein each of said plurality of assembly wells has a plurality of crushable nibs for fixedly securing each of said detector assembly and said emitter assembly in its respective assembly wells.

* * * * *